(12) United States Patent
Good et al.

(10) Patent No.: US 11,643,943 B1
(45) Date of Patent: May 9, 2023

(54) GIMBAL SYSTEMS, APPARATUS, ARTICLES OF MANUFACTURE AND ASSOCIATED METHODS

(71) Applicant: General Electric Company, Schenectady, NY (US)

(72) Inventors: Brandon S. Good, Niskayuna, NY (US); Younkoo Jeong, Clifton Park, NY (US); Guanghua Wang, Niskayuna, NY (US); Bijan Chitsaz, Evendale, OH (US); Gyeong Woo Cheon, Niskayuna, NY (US); Bernard P. Bewlay, Niskayuna, NY (US); Alberto Santamaria-Pang, Bellevue, WA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/538,697

(22) Filed: Nov. 30, 2021

(51) Int. Cl.
*F01D 21/00* (2006.01)
*F01D 25/24* (2006.01)
*F01D 25/28* (2006.01)

(52) U.S. Cl.
CPC .......... *F01D 21/003* (2013.01); *F01D 25/24* (2013.01); *F01D 25/28* (2013.01); *F05D 2260/4031* (2013.01); *F05D 2260/80* (2013.01); *F05D 2270/62* (2013.01); *F05D 2270/8041* (2013.01)

(58) Field of Classification Search
CPC ........ F01D 21/003; F01D 25/24; F01D 25/28; F05D 2260/4031; F05D 2260/80; F05D 2270/62; F05D 2270/8041
See application file for complete search history.

(56) References Cited

U.S. PATENT DOCUMENTS

| | | | |
|---|---|---|---|
| 6,364,524 B1* | 4/2002 | Markham | G01J 5/0022 374/131 |
| 7,662,091 B2* | 2/2010 | Bagley | G02B 23/2492 600/149 |
| 8,184,151 B2* | 5/2012 | Zombo | G02B 23/26 385/116 |
| 8,439,630 B2* | 5/2013 | Lemieux | F01D 21/003 415/118 |
| 9,015,002 B2* | 4/2015 | Zombo | G01J 5/0088 702/135 |
| 9,239,008 B2 | 1/2016 | Ekanayake et al. | |
| 9,706,152 B2 | 7/2017 | Griffith | |
| 10,271,020 B2 | 4/2019 | Stuart et al. | |
| 10,473,528 B2 | 11/2019 | Sakami et al. | |

(Continued)

FOREIGN PATENT DOCUMENTS

EP  3391137  10/2018

*Primary Examiner* — Igor Kershteyn
(74) *Attorney, Agent, or Firm* — Hanley, Flight & Zimmerman, LLC

(57) ABSTRACT

Improved gimbal systems, apparatus, articles of manufacture and associated methods are disclosed. Examples include a panel including a window, the window to define an aperture for a sensor; a platform to mount the sensor, the platform including a first pinion; a first stepper motor to move the first pinion about a first arched rack; a gimbal body including the first arched rack and a second pinion; and a second stepper motor to move the second pinion about a second arched rack, the second arched rack positioned orthogonally to the first arched rack.

20 Claims, 11 Drawing Sheets

(56) References Cited

U.S. PATENT DOCUMENTS

| | | |
|---|---|---|
| 10,823,618 B2 | 11/2020 | Wang et al. |
| 10,830,132 B2 | 11/2020 | Wang et al. |
| 10,845,253 B2 | 11/2020 | Wang et al. |
| 2005/0281520 A1* | 12/2005 | Kehoskie ............ G02B 23/2492 385/117 |
| 2007/0107504 A1* | 5/2007 | Smed .................... F01D 21/003 73/112.01 |
| 2008/0277586 A1 | 11/2008 | Cardinale |
| 2012/0281083 A1 | 11/2012 | Chivers et al. |
| 2014/0102179 A1 | 4/2014 | Ekanayake et al. |
| 2016/0119592 A1 | 4/2016 | Stuart et al. |
| 2016/0212360 A1* | 7/2016 | Williams ................. H04N 5/33 |
| 2016/0227148 A1 | 8/2016 | Griffith |
| 2017/0234734 A1* | 8/2017 | Sakami ................ H04N 5/2254 359/820 |
| 2018/0195896 A1 | 7/2018 | Wang et al. |
| 2018/0195906 A1 | 7/2018 | Wang et al. |
| 2019/0301945 A1 | 10/2019 | Wang et al. |
| 2020/0200692 A1 | 6/2020 | Wang et al. |
| 2021/0076006 A1 | 3/2021 | O'Neill et al. |

* cited by examiner

| ANGLE θ | RATIO (W₂/W₁) |
|---|---|
| 45° | .352 |
| 30° | .485 |
| 20° | .599 |
| 15° | .670 |
| 10° | .755 |

(For α = 57°)

GIMBAL SYSTEMS, APPARATUS, ARTICLES OF MANUFACTURE AND ASSOCIATED METHODS

FIELD OF THE DISCLOSURE

This disclosure relates generally to gimbal design and, more particularly, to improved gimbal systems, apparatus, articles of manufacture, and associated methods.

BACKGROUND

In recent years, miniaturization of sensors has made a wider set of locations available for placement of these sensors. However, some locations include high temperatures and/or other harsh conditions, which can damage the sensors.

One environment that benefits from sensors to monitor the environment is a gas turbine. Gas turbines typically include a turbine casing disposed about hot gas components, with a cowl disposed about the casing. Many turbines include an annular cavity between the casing and the cowl, with turbine components disposed within the annular cavity. Hot fluids flowing within the turbine may radiate heat to the annular cavity and cause turbine components to reach undesirable temperatures. Areas of abnormally high temperature near turbine components can degrade the components more quickly and reduce the operating lifetime of the components.

Sensors able to withstand higher temperatures are also useful across the aerospace, power, transportation, and medical industries. Accordingly, various methods of protecting sensors in high temperature environments have emerged.

Figure 1:
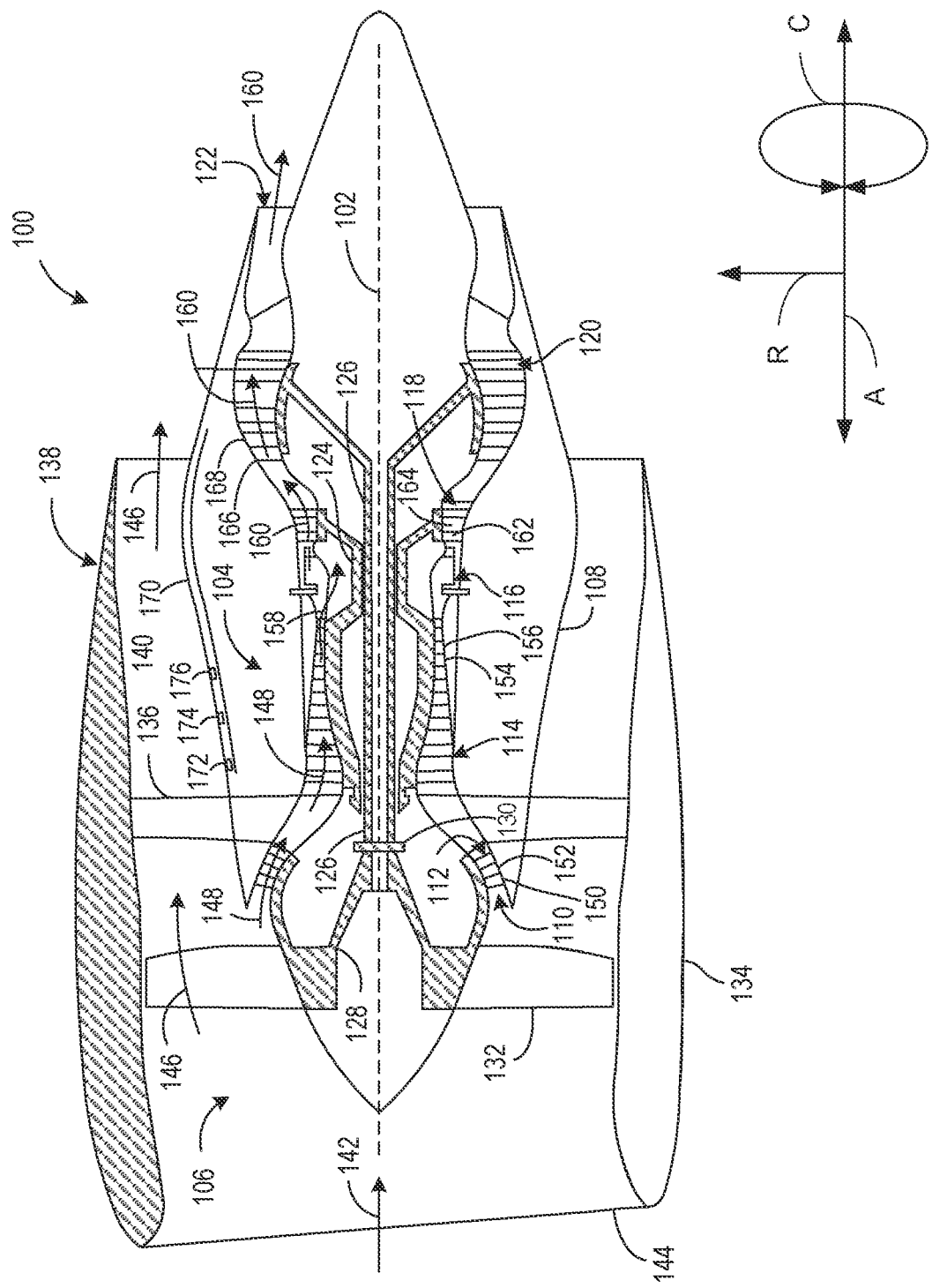
FIG. 1 is a cross-sectional view of an example turbofan gas turbine engine in which examples disclosed herein may be implemented.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, etc.).

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Aircrafts include engines that act as a propulsion system to generate mechanical power and forces such as thrust. A gas turbine, also called a combustion turbine or a turbine engine, is a type of internal combustion engine that can be implemented in the propulsion system of an aircraft. For example, a gas turbine can be implemented in connection with a turbofan or a turbojet aircraft engine. Gas turbines also have significant applications in areas such as industrial power generation.

The area under a cowling of a gas turbine engine is exposed to high heat. To monitor temperatures within the under-cowl area, a common approach includes installing thermocouples throughout the under-cowl area. Each thermocouple measures temperature at single point, its thermocouple junction. Therefore, many thermocouples must be installed to achieve adequate coverage of the under-cowl area. Some approaches utilize fixed infrared (IR) cameras with small viewing windows. By minimizing the size of the viewing window, the camera is exposed to less heat and is protected from the harsh environment. However, fixed cameras with small viewing windows do not maximize the area of coverage of the camera sensors. Therefore, relatively more cameras must be placed in the under-cowl area to achieve adequate coverage of the surfaces to be monitored.

Placing many cameras in the under-cowl area is often disadvantageous. First, each additional camera module placed under the cowl blocks airflow, making it relatively more difficult to cool the cameras and the under-cowl area. Second, camera modules are costly and each additional module increases overall system cost. Third, increasing the number of camera modules increases communication overhead within the system. Fourth, it is difficult to place cameras in the under-cowl area, and, therefore, it is time consuming and costly to install each additional unit. Finally, an increased number of cameras increases the possibility of a camera failure. Camera failure leads to increased system maintenance, replacement of cameras, etc. One skilled in the art would readily identify further challenges with placing additional cameras in the under-cowl area.

Various methods have been proposed to increase the field of view of IR cameras while protecting them from harsh environments (e.g., rotary kilns, blast furnaces, incinerators, fuel boilers, nuclear reactors, etc.). For example, some systems include cameras with specialized lenses (e.g., fisheye lenses) that increase the field of view. Fisheye lenses can be paired with dome-shaped IR windows to facilitate a relatively large field of view. However, fisheye lenses generate images with significant distortion, and dome-shaped IR windows are costly to manufacture and allow a larger thermal radiation load to enter the viewing window. Despite such attempts, there has, to this point, not been a design that effectively maximizes or otherwise increases the field of view of a camera while minimizing or otherwise reducing the camera window area.

The offset-arch gimbal design described herein allows an infrared camera to maximize and/or otherwise increase a field of view while minimizing and/or otherwise decreasing a viewing window. By solving the technical problems described above, the offset-arch gimbal allows for a greater engine surface coverage per camera, a smaller viewing window, relatively less heat transfer through the protective enclosure/window, a lower system cost, less ongoing maintenance, etc.

The offset-arch gimbal described herein has utility beyond under-cowl monitoring with IR cameras. An IR camera is used as an example sensor for the example offset-arch gimbal. However, other types of cameras (e.g., RGB) can also be used with the offset-arch gimbal. More generally, any sensor (e.g., CMOS, LIDAR, ultrasonic, etc.) can benefit from coupling to an offset-arched gimbal, as the offset-arch gimbal design may increase an area of coverage while decreasing a window size associated with a sensor.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe example implementations and not to be taken limiting on the scope of the subject matter described in this disclosure. Certain features from different aspects of the following description may be combined to form yet new aspects of the subject matter discussed below.

When introducing elements of various embodiments of the present disclosure, the articles "a," "an," "the," and "said" are intended to mean that there are one or more of the elements.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the terms "axial" and "longitudinal" both refer to a direction parallel to the centerline axis of a gas turbine (e.g., a turbofan, a core gas turbine engine, etc.), while "radial" refers to a direction perpendicular to the axial direction, and "tangential" or "circumferential" refers to a direction mutually perpendicular to the axial and radial directions. Accordingly, as used herein, "radially inward" refers to the radial direction from the outer circumference of the gas turbine towards the centerline axis of the gas turbine, and "radially outward" refers to the radial direction from the centerline axis of the gas turbine towards the outer circumference of gas turbine. As used herein, the terms "forward", "fore", and "front" refer to a location relatively upstream in an air flow passing through or around a component, and the terms "aft" and "rear" refer to a location relatively downstream in an air flow passing through or around a component.

FIG. 1 is a schematic cross-sectional view of a prior art turbofan-type gas turbine engine 100 ("turbofan 100"). As shown in FIG. 1, the turbofan 100 defines a longitudinal or axial centerline axis 102 extending therethrough for reference. In general, the turbofan 100 may include a core turbine 104 or gas turbine engine disposed downstream from a fan section 106.

The core turbine 104 generally includes a substantially tubular outer casing 108 ("turbine casing 108") that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106 ("fan shaft 128"). In some examples, the LP shaft 126 may couple directly to the fan shaft 128 (i.e., a direct-drive configuration). In alternative configurations, the LP shaft 126 may couple to the fan shaft 128 via a reduction gearbox 130 (e.g., an indirect-drive or geared-drive configuration).

As shown in FIG. 1, the fan section 106 includes a plurality of fan blades 132 coupled to and extending radially outwardly from the fan shaft 128. An annular fan casing or nacelle 134 circumferentially encloses the fan section 106 and/or at least a portion of the core turbine 104. The nacelle 134 is supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbofan 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator vanes 162 and HP turbine rotor blades 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the turbofan 100, the core turbine 104 serves a similar purpose and sees a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106. FIG. 1 further includes a cowling 170 and offset-arch gimbals 172-176. The cowling 170 is a covering which may reduce drag and cool the engine. The offset-arch gimbals 172-176 may, for example, include infrared cameras to detect a thermal anomaly in the under-cowl area of the engine 100.

Figure 2:
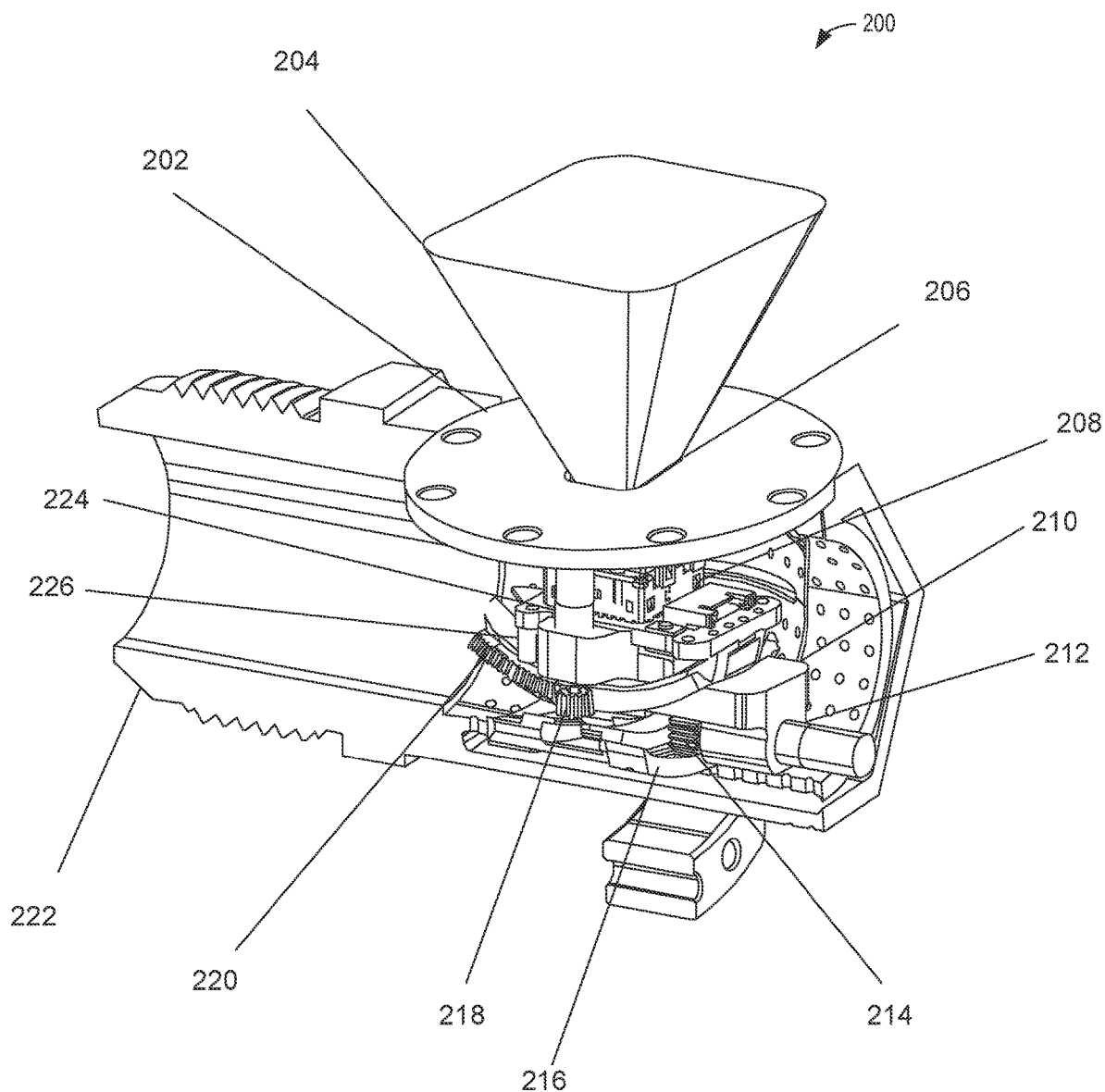
FIG. 2 is a cross-sectional view of an example offset-arch gimbal that can be disposed in the example gas turbine engine of FIG. 1.

FIG. 2 is a cross-sectional view of an example offset-arch gimbal 200 that can be disposed in the example gas turbine engine 100 of FIG. 1. For example, the offset-arch gimbal 200 may be disposed in an area underneath the cowling 170 of the engine 100 of FIG. 1. The offset-arch gimbal 200 includes an example panel 202, an example field of view 204, an example window 206, an example IR camera 208, an example gimbal body 210, an example first stepper motor 212, an example first pinion 214, an example first arched rack 216, an example second pinion 218, an example second arched rack 220, an example enclosure 222, an example second stepper motor 224, and an example sensor platform 226.

The example offset-arch gimbal 200 includes the example panel 202. The offset-arch gimbal 200 is disposed in the under-cowl area of the turbofan engine 100. The panel 202 defines a barrier between the interior of the enclosure 222 and the under-cowl area. The panel 202 also includes a window 206 through which the IR camera 208 can operate.

The example window 206 is an opening through which at least some thermal energy can pass (e.g., defines an aperture through which energy passes). In some examples, the window 206 may further include more than one openings or structures that allow energy to pass into the enclosure 222.

The example window 206 includes at least one material that allows the IR camera 208 to detect thermal energy from the environment. For example, the window 206 may include zinc selenide, germanium, sapphire, quartz, calcium fluoride, silicon, etc. In examples including a RGB camera, quartz, glass, sapphire, etc. may be used. In general, the example window 206 may include any material that allows the sensors housed within the example enclosure 222 to receive information from the environment. In other examples, the window may be an empty or open space.

The panel 202 is attached to the enclosure 222 via a mechanical fastener. However, in other examples, the panel 202 may be welded to the enclosure 222 or the enclosure 222 and the panel 202 may be a unitary, single-piece construction.

The example enclosure 222 is a fixed, stationary enclosure that protects the components disposed within from the high temperature and/or otherwise harsh environment outside of the enclosure 222. The enclosure 222 also includes additional space to permit airflow within the enclosure, allow electrical wiring and/or communication circuitry to function, etc. FIG. 2 illustrates the enclosure 222 encasing the IR camera 208. In some examples, multiple IR cameras disposed can be disposed within the enclosure 222. In some examples, the enclosure 222 may be movable. For example, the enclosure 222 may be attached to a servo that coordinates with the offset-arch gimbal 200 to increase the coverage area of the camera, or a robot that moves the enclosure 222 about the harsh environment.

The IR camera 208 detects thermal energy emitted from the environment and converts the thermal energy to an electronic signal. This signal can be monitored and analyzed with processor circuitry, as described below in connection with FIGS. 6-10, to detect areas of high heat and/or other anomalies within the under-cowl environment.

The gimbal body 210 is operatively coupled to the first arched rack 216. The first arched rack 216 is coupled to the enclosure 222 and defines a path for the first pinion 214. The gimbal body 210 additionally includes the second arched rack 220. The second arched rack 220 is disposed orthogonally to the first arched rack 216 and defines a movement path for the second pinion 218. As with the first stepper motor 212 and the first arched rack 216, the second stepper motor 224 can rotate the second pinion 218 about the second arched rack 220.

In the illustration of FIG. 2, thermal energy from the under-cowl area of the engine 100 is shown passing through the window 206. The field of view 204 is the area the IR camera 208 can image. By adjusting the curvature, positioning, and/or length of the first and/or second arched racks, the field of view 204 can be maximized. As will be described in FIGS. 4A-4C, the field of view 204 changes as the IR camera 208 is repositioned by the first stepper motor 212 and the second stepper motor 224. Such repositioning can increase an area of coverage of the IR camera 208.

In operation, the gimbal body 210 moves about the first arched rack 216 to simultaneously tilt the gimbal body 210, the sensor platform 226, the IR camera 208, and other coupled components. As the first arched rack 216 follows a generally curved shape, movement about the rack simultaneously translates and rotates each of these elements. The simultaneous translation and rotation of the IR camera 208 and its effects on the field of view 204 are described below in association with FIGS. 5A-5C.

By translating and rotating the IR camera 208, the area of coverage through a fixed window, such as the window 206, can be maximized or otherwise increased. The first stepper motor 212 can move the first pinion 214 in either a clockwise or counterclockwise direction. Similarly, the second stepper motor 224 can rotate the second pinion 218 in a clockwise or counterclockwise direction to simultaneously rotate and translate the IR camera 208.

Figure 3:
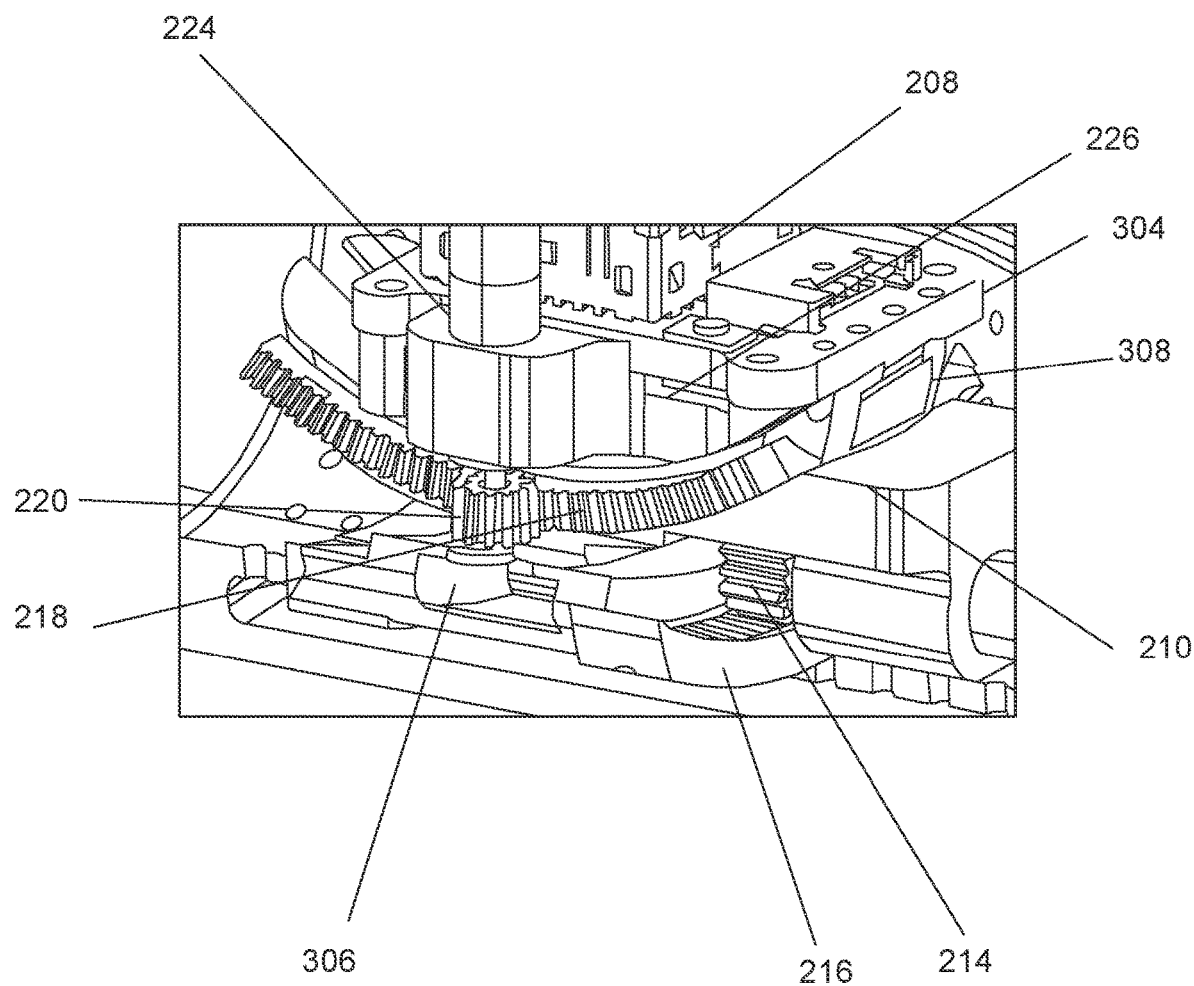
FIG. 3 is another cross-sectional view of the example offset-arch gimbal of FIG. 2.

FIG. 3 is another cross-sectional view of the example offset-arch gimbal of FIG. 2. FIG. 3 includes a circuit board 304, a first arched groove 306, and a second arched groove 308. FIG. 3 also shows the second stepper motor 224, the sensor platform 226, the gimbal body 210, the first pinion 214, the first arched rack 216, the second pinion 218, and the second arched rack 220 of FIG. 2 in greater detail.

The circuit board 304 connects electronic components of the offset-arch gimbal of FIG. 2. This may include a microprocessor, memory, non-volatile storage, volatile storage, etc. In some examples, the circuit board may include artificial intelligence (AI) circuitry to process image data and assist in anomaly detection. In some examples, the AI circuitry may include a convolutional neural network to capture spatial and temporal dependencies (e.g., identify an anomaly) in an image through the application of filters. In some examples, the AI circuitry may include a deep learning based generative AI method, such as a vector quantized variational autoencoder (VQVAE). In other examples, the circuit board 304 may contain specialized circuitry and/or instructions to coordinate offset-arch gimbals to cover an increased area. In some examples, a plurality of IR cameras can coordinate together to cover an under-cowl area and detect thermal and/or other anomalies. The circuit board may also house communication circuitry that can communicatively couple a plurality of offset arched-gimbals.

The first arched groove 306 defines a pathway for the gimbal body 210 to move through. The first arched groove 306 both secures the gimbal body 210 and guides motion of the gimbal body 210 as the first arched rack 216 and the first pinon 214 operates. In this example, the first arched groove 306 and the example gimbal body 210 are operatively coupled via a ball bearing system. In some examples, the first arched groove and the example gimbal body 210 are operatively coupled via a sleeve bearing system. In other examples, the gimbal body 210 and the first arched groove 306 may be secured via friction and/or any other coupling method. The first arched groove 306 follows the curvature of the first arched rack 216.

The second arched groove 308 restricts movement of the sensor platform 226. The second arched groove 308 both secures the sensor platform 226 and guides motion of the sensor platform 226 as the second arched rack 220 and the second pinion 218 operate. In this example, the second arched groove 308 and the example sensor platform 226 are operatively coupled via a ball bearing system in which the bearing balls roll within the second arched groove 308, reducing friction during motion. In other examples, the sensor platform 226 may be secured via friction and/or any other coupling method. The second arched groove 308 follows the curvature of the second arched rack 220.

FIGS. 4A-4D illustrate example positioning of the offset-arch gimbal 200 of FIGS. 2-3 in operation. Each of FIGS. 4A-4D shows how positioning the gimbal body 210 and the sensor platform 226 results in example fields of view 418-424. FIGS. 4A-4D illustrate the gimbal body 210 disposed at either a position 410 or a position 412 and the sensor platform 226 disposed at either a position 414 or a position 416. The positioning about the first arched rack 216 allows the offset-arch gimbal 200 approximately 56 degrees of rotation (−26° to +30°) from neutral about an axis parallel to the first arched rack 216. The second arched rack 220 allows the offset-arch gimbal 200 approximately 42 degrees of rotation (−21° to +21°) from neutral about an axis parallel to the second arched rack 220.

Figure 4A:
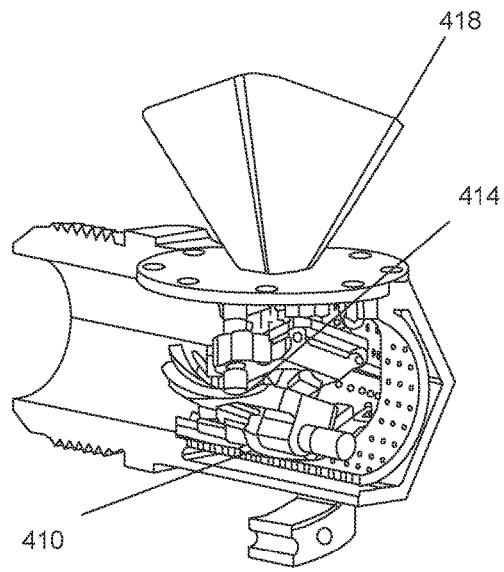
FIGS. 4A-4D are illustrations of example positions of the offset-arch gimbal of FIGS. 2-3 in operation.
Figure 4B:
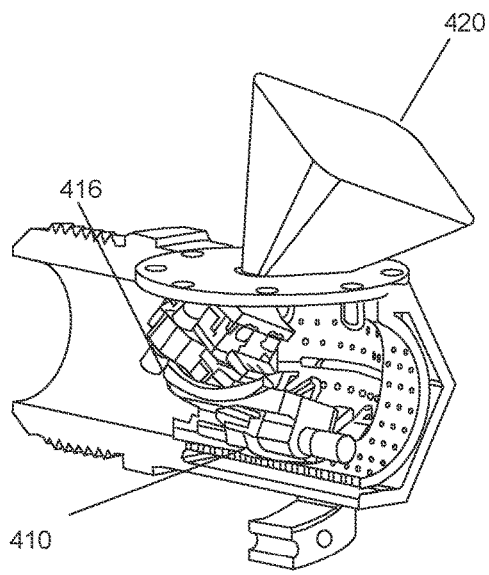

FIG. 4A illustrates the gimbal body 210 at the position 410 of the first arched rack 216 and the sensor platform 226 at the position 414 of the second arched rack 220. This positioning facilitates the example field of view 418. FIG. 4B illustrates the gimbal body 210 at the position 412 of the first arched rack 216 and the sensor platform 226 at the position 414 of the second arched rack 220. This positioning forms the example field of view 420.

Figure 4C:
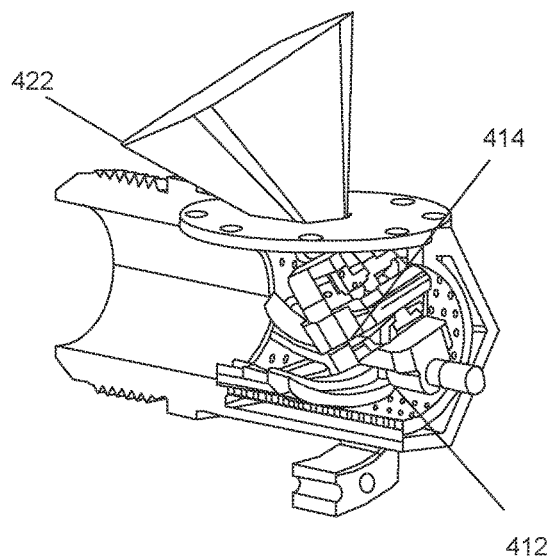
Figure 4D:
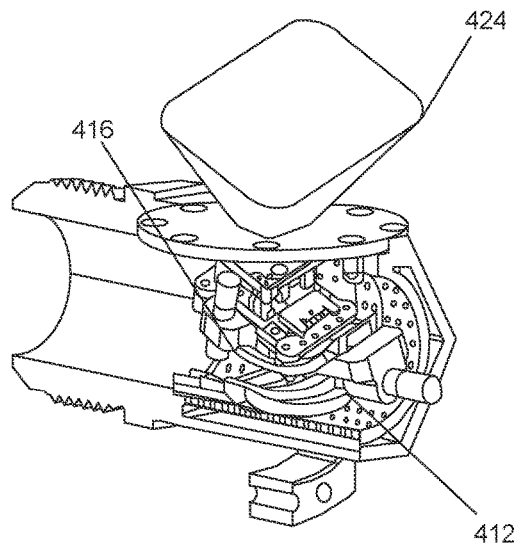

FIG. 4C illustrates the gimbal body 210 at the position 410 of the first arched rack 216 and the sensor platform 226 at the position 414 of the second arched rack 220. This positioning facilitates the example field of view 422. FIG. 4D illustrates the gimbal body 210 at the position 412 of the first arched rack 216 and the sensor platform 226 at the position 416 of the second arched rack 220. This positioning facilitates the example field of view 422. The example positions 410-416 were only selected to illustrate changes to the field of view 204. In operation, the gimbal body 210 can be disposed at any position of the first arched rack 216 and the sensor platform 226 can be disposed at any position of the second arched rack 220, creating many more field of views than are shown in the examples of FIGS. 4A-4D.

Figure 5A:
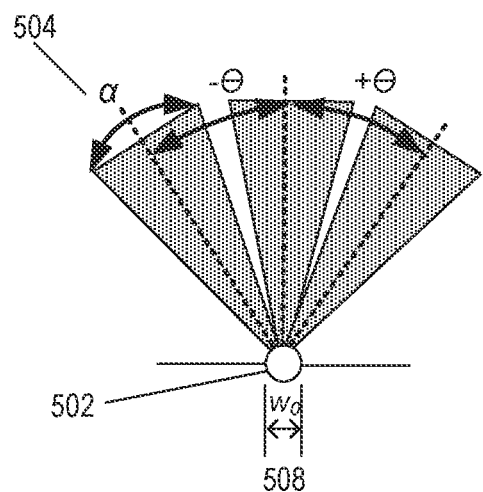
FIGS. 5A-5C illustrate a comparison between window size and field of view for the offset-arch gimbal and other camera designs.
Figure 5B:
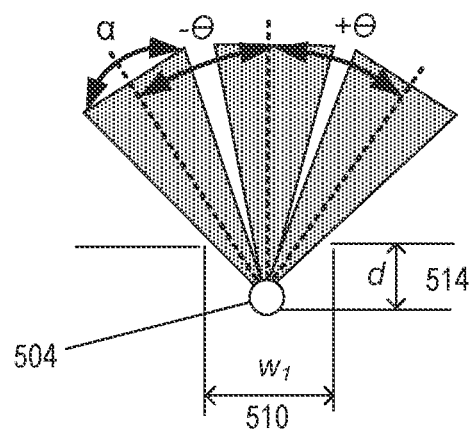
Figure 5C:
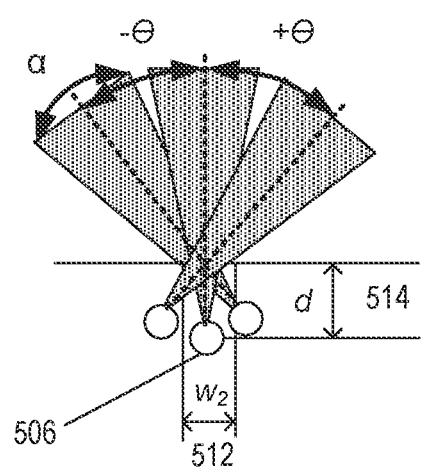

FIGS. 5A-5C are example cross-sectional views illustrating how an example window width (w) varies as an example camera depth (d) increases in order to keep an example field of view (α) and an example angle of rotation (θ) constant. As used herein, a field of view (α) describes how much of the environment in front of the camera will be captured by the camera's sensor without moving the camera. As used herein, an angle of rotation (θ) describes how far from a neutral position a camera can rotate in one direction. As used herein, an area of coverage represents the total portion of the environment a camera can cover when moved and/or and rotated.

Specifically, FIG. 5A illustrates a system that cannot be implemented in a harsh environment at least because there is no camera depth (d) to reduce exposure of the camera to a harsh environment. FIG. 5A includes an example IR camera 502 and an example window width 508 ($w_0$). As described above in connection with FIGS. 2-4, the examples disclosed herein are generally for use in harsh environments such as the under-cowl area of a turbine engine, in which the IR camera 502 can be exposed to excessive thermal energy. Therefore, although the effective coverage of the IR camera 502 in FIG. 5A is maximized and/or otherwise increased for the given field of view (α) and angle of rotation (θ), the IR camera 502 would be in direct contact with the harsh environment. This is unacceptable as the IR camera 502 would be damaged by the high heat and/or other characteristics of the harsh environment.

FIG. 5B illustrates a system without an offset-arch gimbal. A camera 504 is placed behind a window with a depth 514 (d) and a width 510 ($w_1$). Additionally, the camera 504 does not translate in the plane shown. Since the example of FIG. 5B does not include an offset-arch gimbal, the window width 510 ($w_1$) must be relatively larger to maintain the same field of view. However, the relatively larger window width ($w_1$) 510 also allows more exposure of the camera 504 to the harsh environment. The window width 510 ($w_1$) can be approximated in accordance with Equation 1 below:

$$w_1 \approx 2d\{\tan\theta + \tan(\alpha/2)\} \qquad \text{Equation 1.}$$

FIG. 5C illustrates an example system designed in accordance with the offset-arch gimbal 200. The system of FIG. 5C includes an example IR camera 506, an example window width 512 ($w_2$), and an example camera depth 514. As described herein, a pivot point is a point about which an object rotates. For example, a pivot point for the camera 502 of FIG. 5A is a center point of the camera. In contrast, a pivot point for the camera 506 of FIG. 5C is not at a center point of the camera 506 of FIG. 5C. Instead, the pivot point for the camera 506 of FIG. 5C is disposed relatively closer to the window of FIG. 5C than in the examples of FIGS. 5A and 5B. Thus, the area of coverage of the camera 506 of FIG. 5C is the same as that of the camera 502 of FIG. 5A and the camera 504 of FIG. 5B, but the window width 512 ($w_2$) is smaller than the window width 508 ($w_0$) of FIG. 5A and the window width 510 ($w_1$) of FIG. 5B. This is because the camera 506 can translate in the plane shown in accordance with the offset-arch gimbal 200 of FIGS. 2-4. The window width 508 ($w_0$) can be approximated using Equation 2 below:

$$w_2 \approx 2d\tan(\alpha/2) \qquad \text{Equation 2.}$$

Figures 6A, 6B:
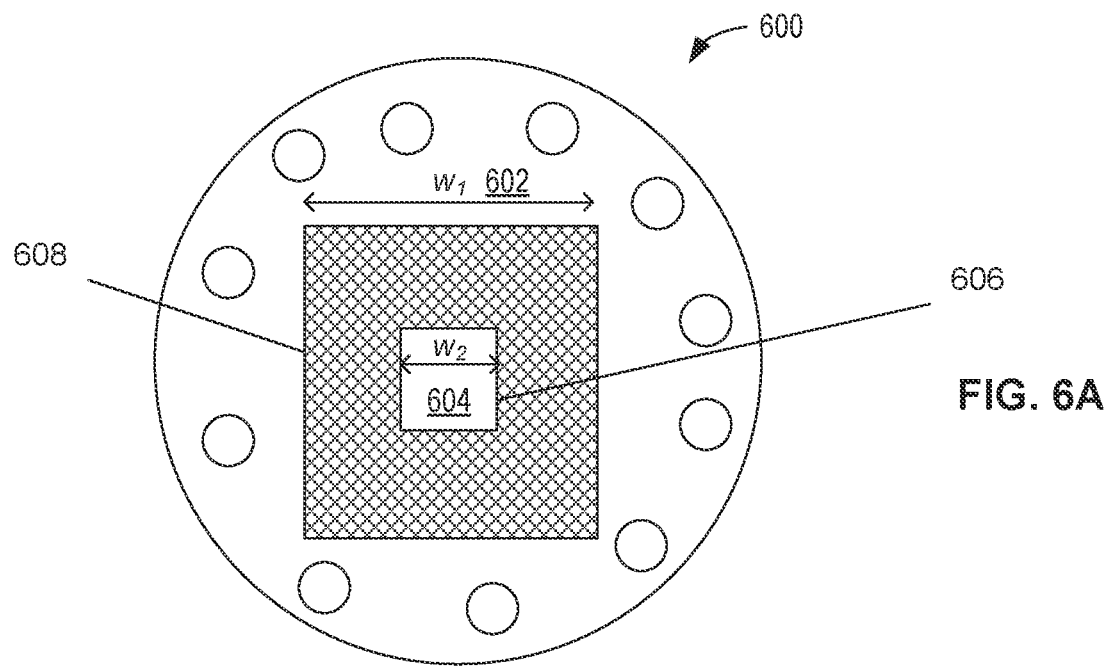
FIG. 6A illustrates a reduction in enclosure viewing window size when using an offset-arch gimbal with a 45° angle of rotation.
FIG. 6B is a table that provides a ratio between a window width of a system designed with the offset-arch gimbal of FIGS. 2-4 and a traditional camera gimbal system.

FIG. 6A illustrates a reduction in enclosure viewing window size when using an offset-arch gimbal with a 45° angle of rotation. FIG. 6A includes an example panel 600, an example first width 602 ($w_1$), an example second width 604 ($w_2$), an example window 606, and an example area 608. The example panel 600 may be similar to the panel 202 of FIG. 2. As the panel 600 is used with a camera with an offset-arch gimbal, a sufficient area of coverage can be achieved with the window 606. The area 608 illustrates the theoretical area needed for a window if not using a design in accordance with the offset-arch gimbal 200.

FIG. 6B is a table that provides, at varying angles of rotation, a ratio between the window width of a system designed with the offset-arch gimbal of FIGS. 2-4 and a traditional camera gimbal system. FIG. 6B generally indicates that as the angle of rotation of the gimbal increases, there is a greater advantage in using the offset-arch gimbal compared to a system where the camera does not translate.

Figure 7:
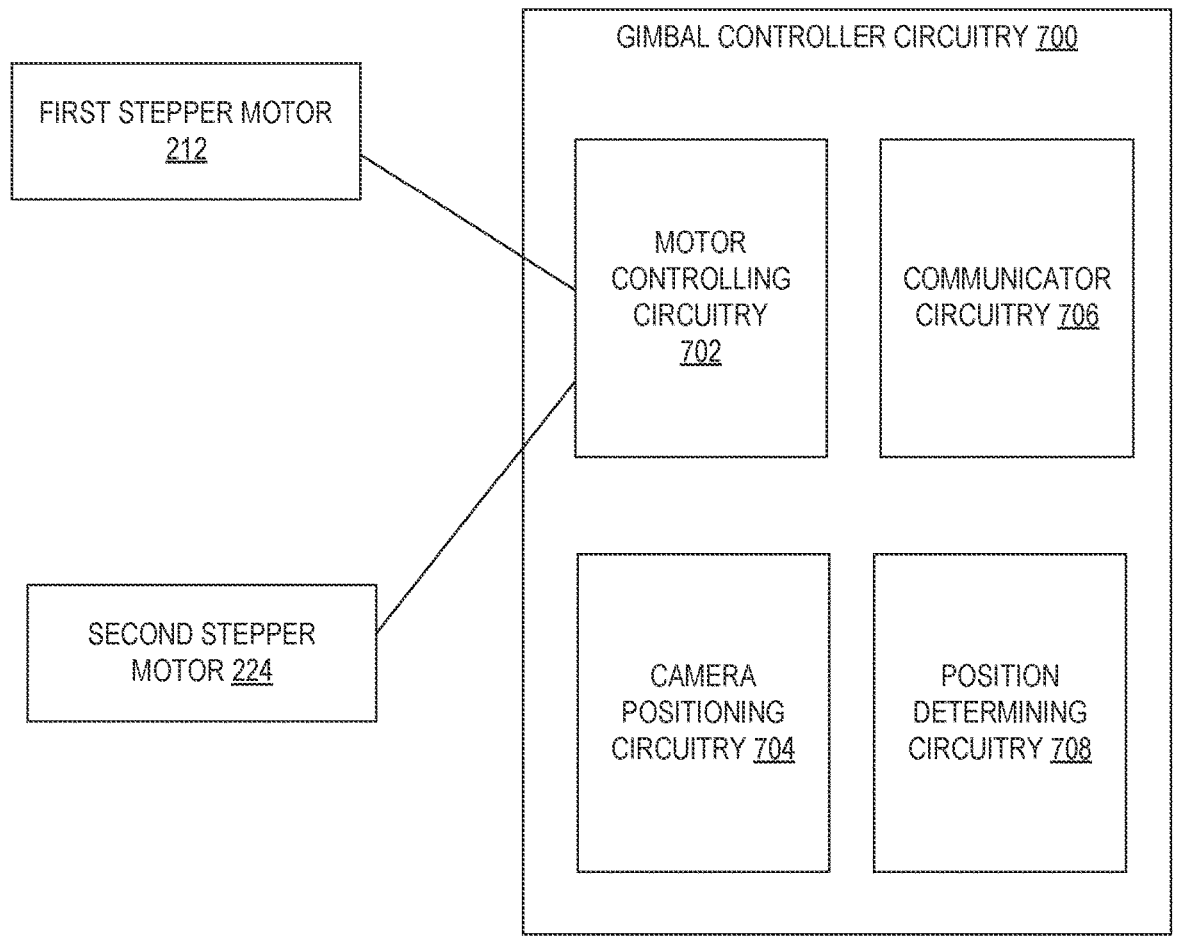
FIG. 7 is a block diagram of example gimbal controller circuitry that can operate the offset-arch gimbal of FIGS. 2-4.

FIG. 7 is a block diagram of example gimbal controller circuitry 700 that can operate the offset-arch gimbal of FIGS. 2-4. The gimbal controller circuitry 700 includes motor controlling circuitry 702, camera positioning circuitry 704, communicator circuitry 706, and position determining circuitry 708. The communicator circuitry 706 receives feedback from sensors disposed in the harsh environment. By receiving feedback from the environment, the offset-arch gimbal 200 can alter the field of view (e.g., the field of view 204) in response to a change in the environment. The example offset-arch gimbal 200 includes the IR camera 208. In some examples, the offset-arch gimbal 200 may be one of a plurality of offset-arch gimbals working together as part of a larger system. Such a system could, for example, use AI circuitry to monitor the harsh environment for abnormalities. In such an example, the communicator circuitry 706 could communicatively couple the offset-arch gimbal 200 to a second offset-arch gimbals in the plurality of offset-arch gimbals. The communicator circuitry 706 sends and receives information to the other components of the gimbal controller circuitry 700 such as the motor controlling circuitry 702, the camera positioning circuitry 704, and the position determining circuitry 708.

The position determining circuitry 708 receives feedback from sensors disposed on or integrated into the offset-arch gimbal 200 of FIG. 2. The position determining circuitry 708 may also sense a position of the offset-arch gimbal based on the position of the first pinion 214 about the first arched rack and the position of the second pinion 218 about the second arched rack 220. For example, the position determining circuitry 708 may receive intermittent feedback from sensors and use this information to determine the position of the offset-arch gimbal 200 in relation to a target area in the harsh environment or in relation to a second of a plurality offset-arch gimbals.

The camera positioning circuitry 704 takes information from the position determining circuitry 708 and converts the information into a set of positions for the motor controlling circuitry 702 to execute by operating the first stepper motor 212 and the second stepper motor 224, respectively.

If no thermal anomaly is detected, the gimbal controller circuitry 700 may operate in a normal imaging mode. In the normal imaging mode, the IR camera 208 may follow a predefined routine based on a specific area of coverage.

For example, in the normal imaging mode, the motor controlling circuitry 702 may operate the IR camera to generally image an area of coverage in a left-to-right, top-to-bottom manner. In an example area imaging process, the motor controlling circuitry 702 can cause the first stepper motor 212 to move until the position determining circuitry 708 determines a first end of the first arched rack 216 has been reached (e.g., a full pan). The motor controlling circuitry 702 can then operate the second stepper motor 224 a relatively lesser amount (e.g., slight tilt). The motor controlling circuitry 702 can then operate the first stepper motor 212 in an opposite direction until the position determining circuitry 708 determines a second position about the first arched rack has been reached (e.g., a second full pan). By repeating the example area imaging process, a defined area can be imaged consistently. The example area imaging process is only one method of operating the IR camera 208. For example, the gimbal controller circuitry 700 may include AI circuitry to provide movement instructions to the camera positioning circuitry 704.

In response to detection of an anomaly, the gimbal controller circuitry 700 may enter an anomaly analysis mode. In the anomaly analysis mode, the IR camera 208 deviates from the normal imaging routine to analyze the anomaly. In anomaly analysis mode, the communicator circuitry 706 may receive a location of an anomaly. The camera positioning circuitry 704 can then receive a current position of the IR camera from the position determining circuitry 708. In response, the camera positioning circuitry 704, which generates powered step-wise pulses at a desired frequency, can determine how the first stepper motor 212 and the second stepper motor 224 must operate to move the field of view 204 to the location of the anomaly.

While an example manner of implementing the gimbal controller circuitry 700 is illustrated in FIG. 7, one or more of the elements, processes, and/or devices illustrated in FIG. 7 may be combined, divided, re-arranged, omitted, eliminated, and/or implemented in any other way. Further, the example motor controlling circuitry, the example camera positioning circuitry 704, the example communicator circuitry 706, and/or the example position determining circuitry 708 may be implemented by hardware, software, firmware, and/or any combination of hardware, software, and/or firmware. Thus, for example, any of the example the example motor controlling circuitry, the example camera positioning circuitry 704, the example communicator circuitry 706, the example position determining circuitry 708 and/or, more generally, the example gimbal controller circuitry 700, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example the example motor controlling circuitry, the example camera positioning circuitry 704, the example communicator circuitry 706, and/or the example position determining circuitry 708 is/are hereby expressly defined to include a non-transitory computer readable storage device or storage disk such as a memory, a digital versatile disk (DVD), a compact disk (CD), a Blu-ray disk, etc., including the software and/or firmware. Further still, the example gimbal controller circuitry 700 of FIG. 7 may include one or more elements, processes, and/or devices in addition to, or instead of, those illustrated in FIG. 7, and/or may include more than one of any or all of the illustrated elements, processes and devices.

In some examples, the offset-arch gimbal 200 includes means for operating a first stepper motor to move a first pinion about a first arched rack. For example, the means for operating the example first stepper motor 212 to move the first pinion 214 about the first arched rack 216 may be implemented by the example motor controlling circuitry 702. In some examples, the motor controlling circuitry 702 may be implemented by machine executable instructions such as that implemented by at least blocks 806, 810 of FIG. 8 executed by processor circuitry, which may be implemented by the example processor circuitry 912 of FIG. 9, the example microprocessor 1000 of FIG. 10, and/or the example Field Programmable Gate Array (FPGA) circuitry 1100 of FIG. 11.

In some examples, the offset-arch gimbal 200 includes means for operating a second stepper motor to move a second pinion about a second arched rack, the second arched rack positioned orthogonally to the first arched rack. For example, the means for operating the example second stepper motor 224 to move the second pinion 218 about the second arched rack 220 may be implemented by the motor controlling circuitry 702 and/or the position determining circuitry 708. In some examples, the position determining circuitry 708 may be implemented by machine executable instructions such as that implemented by at least blocks 802, 804, 808, 812 of FIG. 8.

In some examples, the offset-arch gimbal 200 includes means for means for coupling a sensor to a platform, the platform operatively coupled to a second arched rack. For example, the means for coupling the example IR camera 208 to the sensor platform 226 may be implemented by the sensor platform 226 and/or the IR camera 208. The IR camera 208 may be coupled to the sensor platform 226 by soldering, mechanical fastening, and/or adhesive bonding.

In some examples, the offset-arch gimbal 200 includes means for positioning an IR camera in response to detection of a thermal anomaly. For example, the means for positioning the IR camera 208 in response to detection of a thermal anomaly may be implemented by the motor controlling circuitry 702, the camera positioning circuitry 704, and/or the position determining circuitry 708.

In some examples, the offset-arch gimbal 200 includes means for directing an IR camera in response to detection of a thermal anomaly. For example, the means for directing the IR camera 208 in response to detection of the thermal anomaly may be implemented by the camera positioning circuitry 704.

In some examples, the offset-arch gimbal 200 includes means for coupling the infrared camera to an under-cowl environment of a gas turbine engine. For example, the means for coupling the example IR camera 208 to the under-cowl environment may be implemented by the example enclosure 222. For example, the enclosure 222 may be coupled to the sensor platform 226 by welding, brazing, soldering, mechanical fastening, and/or adhesive bonding.

In some examples, the offset-arch gimbal 200 includes means for guiding a platform about an arched rack. For example, the means for guiding the example sensor platform 226 about the second arched rack 220 may be implemented by the second arched groove 308.

In some examples, the offset-arch gimbal 200 includes means for determining an orientation of the sensor. For example, the means for determining an orientation of the example IR camera 208 may be implemented by the positioning determining circuitry 708.

Figure 8:
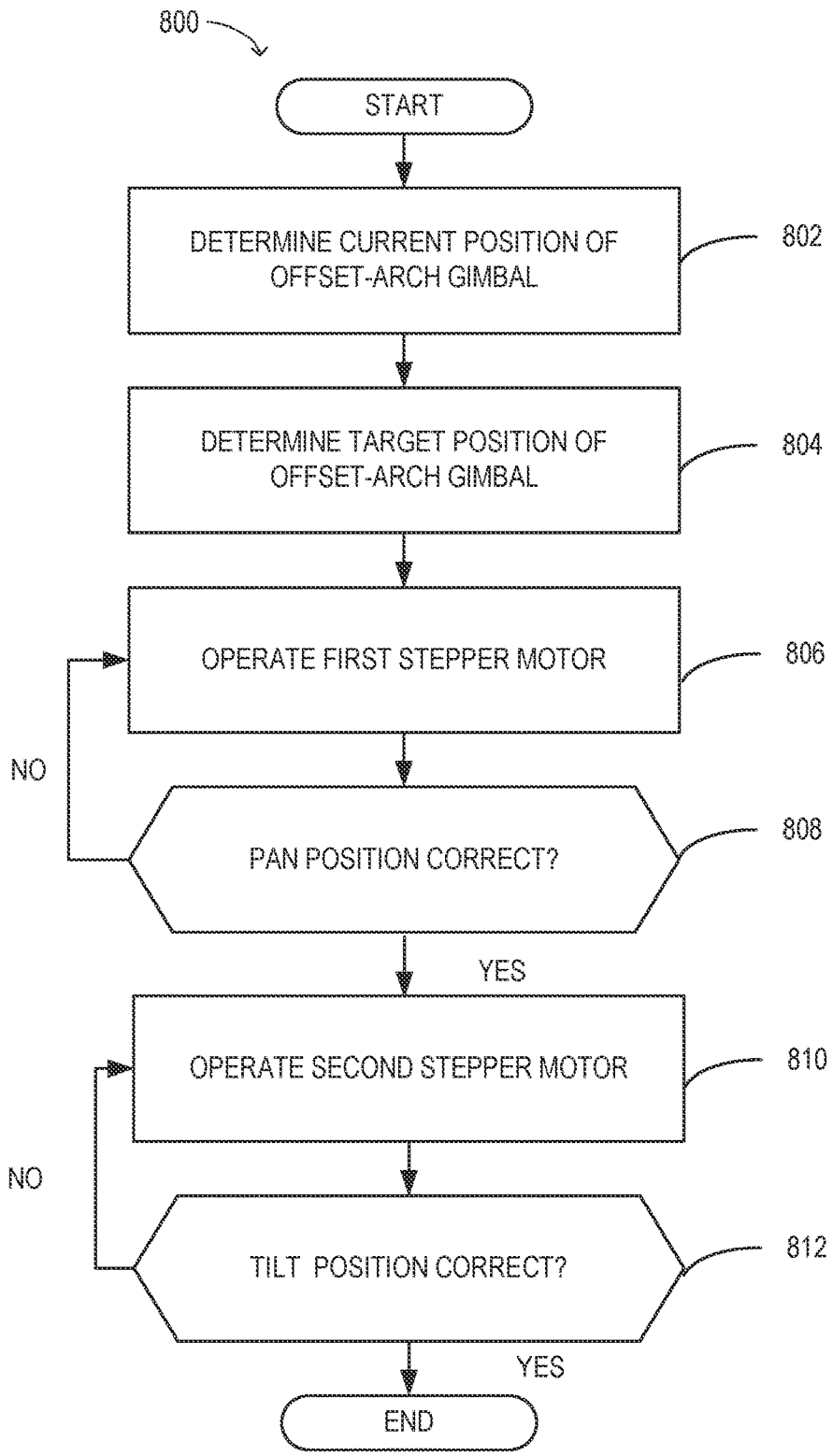
FIG. 8 is a flowchart representative of example machine readable instructions and/or example operations that may be executed and/or instantiated by example processor circuitry to position the offset-arch gimbal of FIGS. 2-4.

A flowchart representative of example hardware logic circuitry, machine readable instructions, hardware implemented state machines, and/or any combination thereof for implementing the gimbal controller circuitry of FIG. 7 is shown in FIG. 8. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 8, many other methods of implementing the example gimbal controller circuitry 700 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 8 is a flowchart representative of example machine readable instructions and/or example operations 800 that may be executed and/or instantiated by processor circuitry to implement the apparatus of FIG. 7 to position the offset-arch gimbal 200 of FIGS. 2-4. The machine readable instructions and/or operations 800 of FIG. 8 begin at block 802, at which the positioning determining circuitry 708 determines the current position of the offset-arch gimbal 200 of FIG. 2. For example, the position determining circuitry 708 may receive intermittent feedback from a plurality of sensors and use this information to determine the position of the offset-arch gimbal 200 in relation to a target area in the harsh environment. In some examples, the position determining circuitry 708 may include circuitry to measure or maintain rotational motion (e.g., a gyroscope).

After determining a position for the IR camera 208, at block 804, the camera positioning circuitry 704 determines a target position of the offset-arch gimbal 200 of FIG. 2. For example, in response to detection of an anomaly, the gimbal controller circuitry 700 may enter an anomaly analysis mode. The camera positioning circuitry 704 can then determine how the first stepper motor 212 and the second stepper motor 224 must operate to move the field of view 204 to the target position. The motor controlling circuitry 702 of FIG. 7 then operates the first stepper motor 212 of FIG. 2, at block 806, to position the offset-arch gimbal 200 at the target position (e.g., pan to the target position).

At block 808, if the position determining circuitry 708 determines that the pan position is correct, the process continues to block 810. Otherwise, if the pan position is not correct, the process returns to block 806, at which the first stepper motor 212 is operated again to adjust the position of the offset-arch gimbal 200 to the target position. At block 810, the second stepper motor 224 is operated by the motor controlling circuitry 702 to tilt the offset-arch gimbal 200 to the target position. At block 812, the process returns to block 810 if the position determining circuitry determines further repositioning is warranted (e.g., a difference between the target position and the target are beyond a threshold). Otherwise, if the position determining circuitry determines that the tilt position is correct, the process ends.

Figure 9:
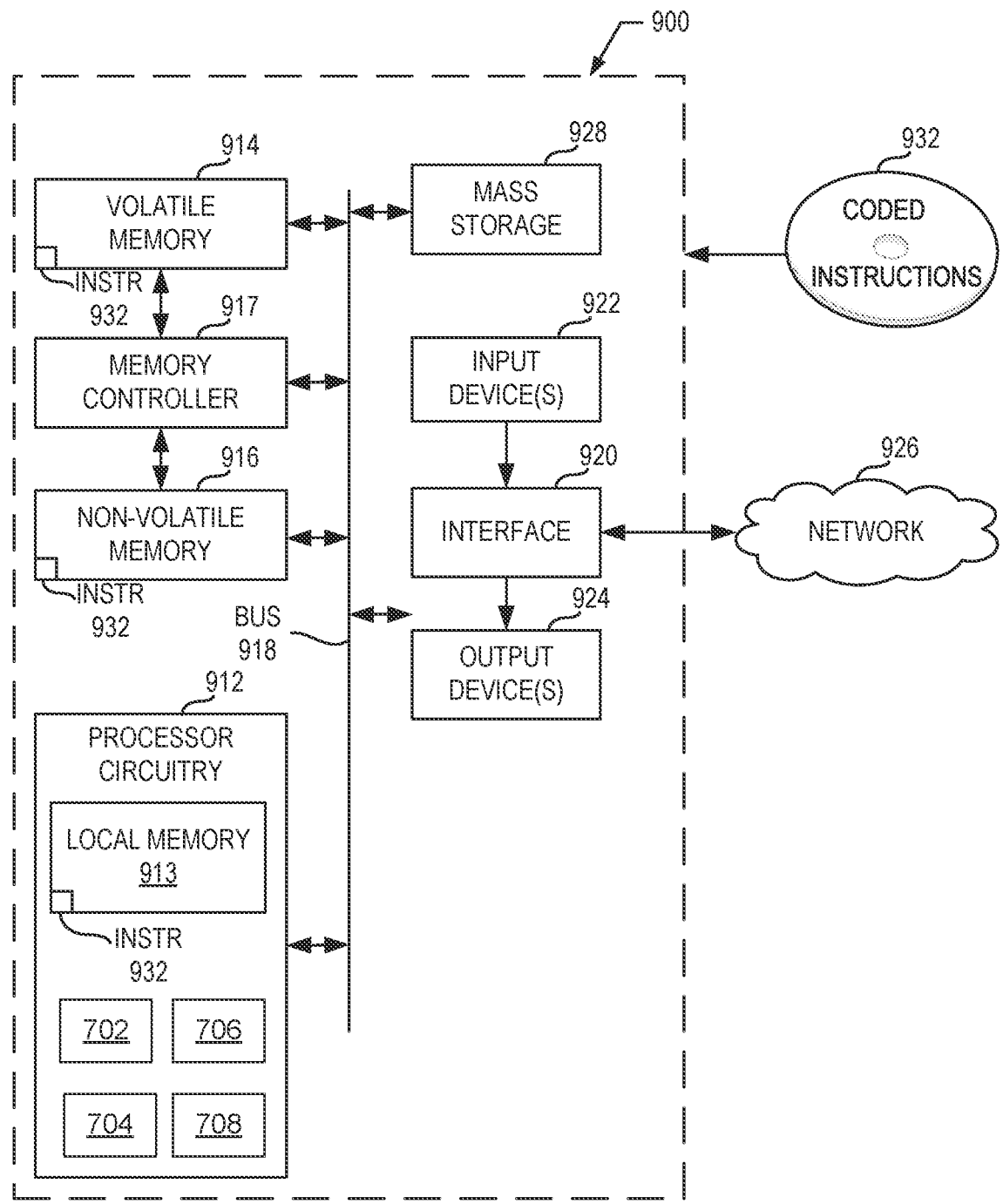
FIG. 9 is a block diagram of an example processor platform structured to execute and/or instantiate the machine readable instructions and/or operations of FIG. 8 to implement the apparatus of FIG. 7.

FIG. 9 is a block diagram of an example processor platform 900 structured to execute and/or instantiate the machine readable instructions and/or operations of FIG. 8 to implement the apparatus of FIG. 7. The processor platform 900 can be, for example, a microcontroller or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the motor controlling circuitry 702, the camera positioning circuitry 704, the communicator circuitry 706, and the positioning determining circuitry 708.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), and/or a button.

One or more output devices 924 are also connected to the interface circuitry 920 of the illustrated example. The output devices 924 can be implemented, for example, by display devices (e.g., to display logged operation information), or a light emitting diode (e.g., to display a warning signal). The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 932, which may be implemented by the machine readable instructions of FIG. 8, may be stored in the mass storage device 928, in the volatile memory 914, in the non-volatile memory 916, and/or on a removable non-transitory computer readable storage medium such as a CD or DVD.

Figure 10:
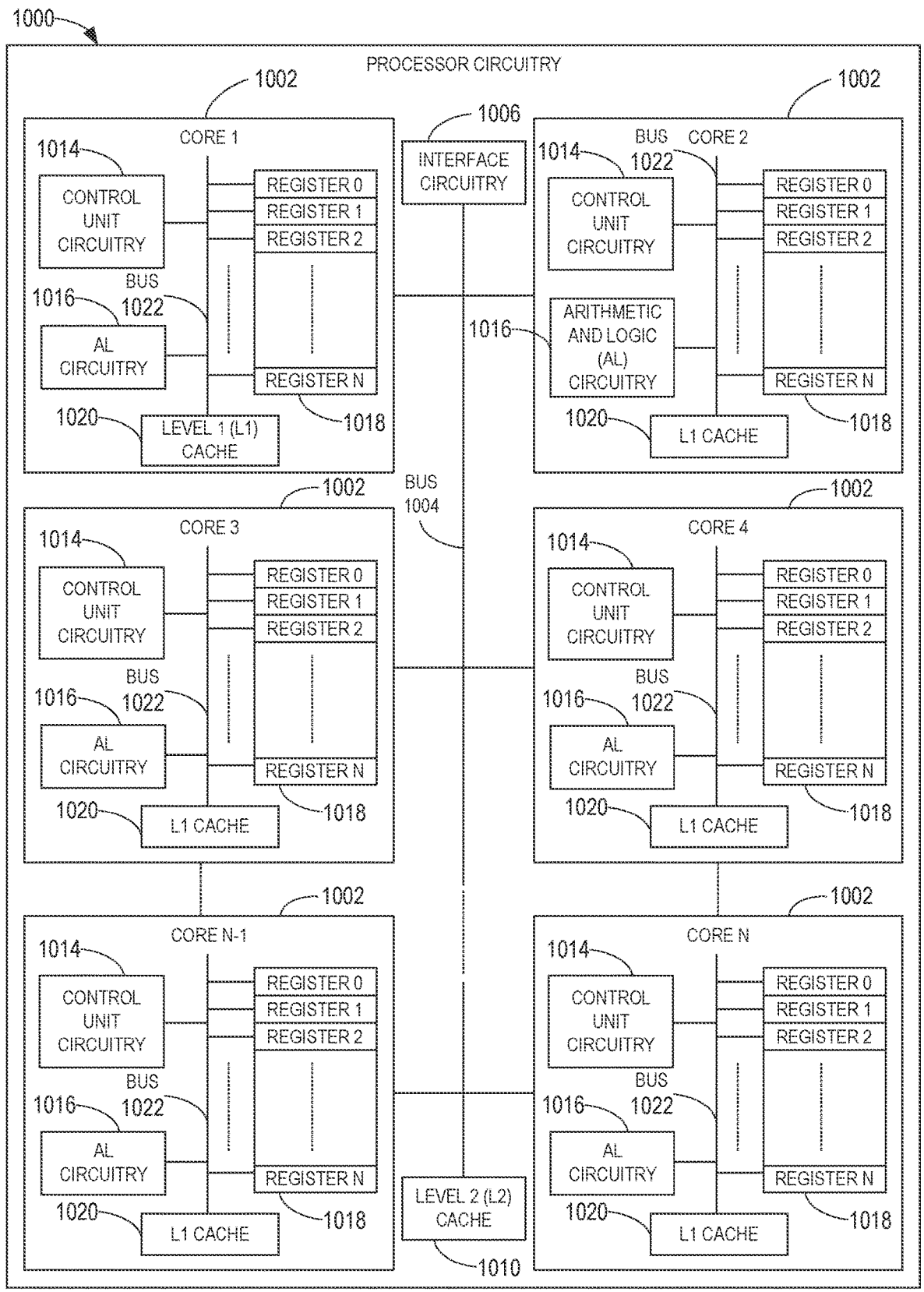
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. For example, the microprocessor 1000 may implement multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowchart of FIG. 7.

The cores 1002 may communicate by an example bus 1004. In some examples, the bus 1004 may implement a communication bus to effectuate communication associated with one(s) of the cores 1002. For example, the bus 1004 may implement at least one of an Inter-Integrated Circuit (I2C) bus, a Serial Peripheral Interface (SPI) bus, a PCI bus, or a PCIe bus. Additionally or alternatively, the bus 1004 may implement any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2_cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the L1 cache 1020, and an example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The bus 1022 may implement at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 11:
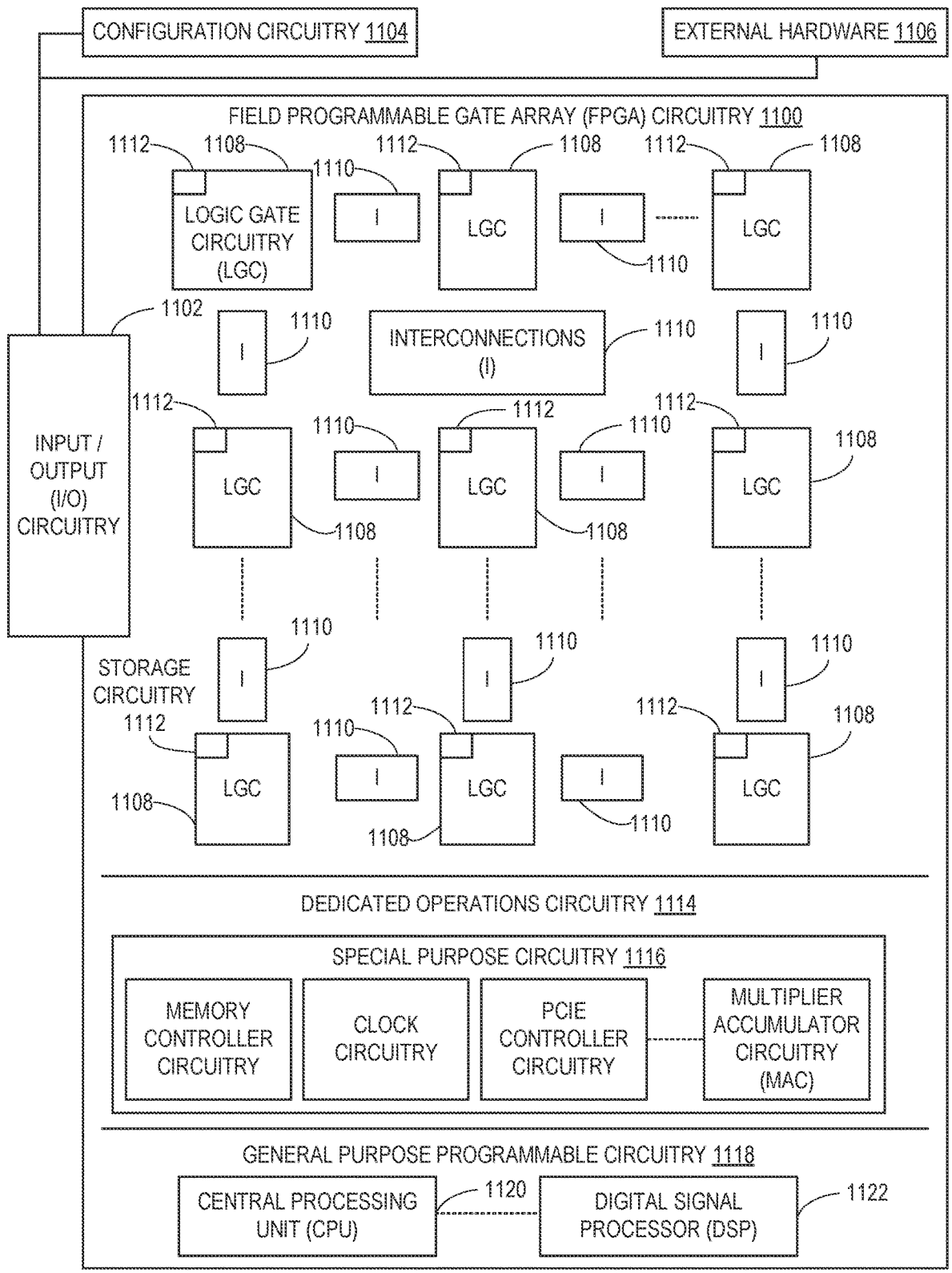
FIG. 11 is a block diagram of another example implementation of the processor circuitry 912 of FIG. 9.

FIG. 11 is a block diagram of another example implementation of the processor circuitry 912 of FIG. 9. In this example, the processor circuitry 912 is implemented by FPGA circuitry 1100. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

More specifically, in contrast to the microprocessor 1000 of FIG. 10 described above (which is a general purpose device that may be programmed to execute some or all of the machine readable instructions represented by the flowchart of FIG. 8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowchart of FIG. 8 In particular, the FPGA 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowchart of FIG. 8. As such, the FPGA circuitry 1100 may be structured to effectively instantiate some or all of the machine readable instructions of the flowchart of FIG. 8 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIG. 11 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware (e.g., external hardware circuitry) 1106. For example, the configuration circuitry 1104 may implement interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware circuitry 1106 may implement the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and interconnections 1110 are configurable to instantiate one or more operations that may correspond to at least some of the machine readable instructions of FIG. 8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. 11 also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowchart of FIG. 8 may be executed by one or more of the cores 1002 of FIG. 10 and a second portion of the machine readable instructions represented by the flowchart of FIG. 8 may be executed by the FPGA circuitry 1100 of FIG. 11.

In some examples, the processor circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The offset-arch gimbal 200 described herein allows an infrared camera to maximize and/or otherwise increase a field of view while minimizing and/or otherwise decreasing a viewing window area. By solving the technical problems described herein, the offset-arch gimbal allows for a greater engine surface coverage per camera, a smaller viewing window, relatively less heat transfer through the protective enclosure/window, a lower system cost, less ongoing maintenance, etc.

Further aspects of the present disclosure are provided by the subject matter of the following clauses.

An apparatus to position a sensor comprising a panel including a window, the window to define an aperture for a sensor, a platform to mount the sensor, the platform including a first pinion, a first stepper motor to move the first pinion about a first arched rack, a gimbal body including the first arched rack and a second pinion, and a second stepper motor to move the second pinion about a second arched rack, the second arched rack positioned orthogonally to the first arched rack.

The apparatus of any preceding clause, wherein the sensor is an infrared camera housed in an enclosure.

The apparatus of any preceding clause, wherein the infrared camera is placed in an under-cowl environment of a gas turbine engine.

The apparatus of any preceding clause, wherein a first degree of curvature of the first arched rack is different from a second degree of curvature of the second arched rack.

The apparatus of any preceding clause, further including an arched groove and a ball bearing to guide the gimbal body.

The apparatus of any preceding clause, wherein a pivot point for the platform is above the sensor.

The apparatus of any preceding clause, further including position determining circuitry to determine an orientation of the sensor.

Example 8 includes an apparatus comprising an infrared camera disposed in an enclosure, a gimbal to position the infrared camera, the gimbal including a first arched rack positioned orthogonally to a second arched rack, a first stepper motor to move a first pinion about the first arched rack, a second stepper motor to move a second pinion about the second arched rack, and motor controlling circuitry to operate the first stepper motor and the second stepper motor to position the infrared camera.

The apparatus of any preceding clause, wherein the enclosure is coupled to a cowling of a gas turbine engine.

Example 10 includes the apparatus of any preceding clause, further including a window.

The apparatus of any preceding clause, further including artificial intelligence circuitry to control the first and second stepper motors.

The apparatus of any preceding clause, wherein a curvature of the first arched rack is different from a curvature of the second arched rack.

The apparatus of any preceding clause, further including at least one of a ball bearing or a sleeve bearing.

The apparatus of any preceding clause, further including position determining circuitry to determine a position of the sensor.

An apparatus to position a sensor disposed in an enclosure comprising means for operating a first stepper motor to move a first pinion about a first arched rack, means for operating a second stepper motor to move a second pinion about a second arched rack, the second arched rack positioned orthogonally to the first arched rack, means for coupling the sensor to a platform, the platform operatively coupled to the second arched rack, and means for positioning the infrared camera in response to detection of a thermal anomaly.

The apparatus of any preceding clause wherein the sensor is an infrared camera housed in an enclosure.

The apparatus of any preceding clause, further including means for directing the infrared camera to image a thermal anomaly.

The apparatus of any preceding clause, further including means for coupling the infrared camera to an under-cowl environment of a gas turbine engine.

The apparatus of any preceding clause, further including means for guiding the platform about the first arched rack.

The apparatus of any preceding clause, further including means for determining an orientation of the sensor.

The following claims are hereby incorporated into this Detailed Description by this reference, with each claim standing on its own as a separate embodiment of the present disclosure.

What is claimed is:

1. An apparatus to position a sensor comprising:
    a panel including a window, the window to define an aperture for a sensor;
    a platform to mount the sensor, the platform including a first pinion;
    a first stepper motor to move the first pinion about a first arched rack;
    a gimbal body including the first arched rack and a second pinion; and
    a second stepper motor to move the second pinion about a second arched rack, the second arched rack positioned orthogonally to the first arched rack.

2. The apparatus of claim 1, wherein the sensor is an infrared camera housed in an enclosure.

3. The apparatus of claim 2, wherein the infrared camera is disposed in an under-cowl environment of a gas turbine engine.

4. The apparatus of claim 1, wherein a curvature of the first arched rack is different from a curvature of the second arched rack.

5. The apparatus of claim 1, further including an arched groove and a ball bearing to guide the gimbal body.

6. The apparatus of claim 1, wherein a pivot point for the platform is above the sensor.

7. The apparatus of claim 1, further including position determining circuitry to determine an orientation of the sensor.

8. An apparatus comprising:
    an infrared camera disposed in an enclosure;
    a gimbal to position the infrared camera, the gimbal including a first arched rack positioned orthogonally to a second arched rack;
    a first stepper motor to move a first pinion about the first arched rack;
    a second stepper motor to move a second pinion about the second arched rack; and
    motor controlling circuitry to operate the first stepper motor and the second stepper motor to position the infrared camera.

9. The apparatus of claim 8, wherein the enclosure is coupled to a cowling of a gas turbine engine.

10. The apparatus of claim 9, further including a window defined by the enclosure.

11. The apparatus of claim 8, further including artificial intelligence circuitry to control the first and second stepper motors.

12. The apparatus of claim 8, wherein a curvature of the first arched rack is different from a curvature of the second arched rack.

13. The apparatus of claim 8, further including at least one of a ball bearing or a sleeve bearing to constrain motion of the gimbal.

14. The apparatus of claim 8, further including position determining circuitry to determine a position of the sensor.

15. An apparatus to position a sensor disposed in an enclosure comprising:
   means for operating a first stepper motor to move a first pinion about a first arched rack;
   means for operating a second stepper motor to move a second pinion about a second arched rack, the second arched rack positioned orthogonally to the first arched rack;
   means for coupling the sensor to a platform, the platform operatively coupled to the second arched rack; and
   means for positioning an infrared camera in response to detection of a thermal anomaly.

16. The apparatus of claim 15, wherein the infrared camera is housed in an enclosure.

17. The apparatus of claim 16, further including means for directing the infrared camera to image a thermal anomaly.

18. The apparatus of claim 16, further including means for coupling the infrared camera to an under-cowl environment of a gas turbine engine.

19. The apparatus of claim 15, further including means for guiding the platform about the first arched rack.

20. The apparatus of claim 15, further including means for determining an orientation of the sensor.

\* \* \* \* \*